United States Patent Office 3,313,867
Patented Apr. 11, 1967

---

3,313,867
MODIFIED ACRYLONITRILE POLYMERS
William A. Blackburn, Chapel Hill, N.C., and Charles H. Apperson, Decatur, Ala., assignors to Monsanto Company, St. Louis, Mo., a corporation of Delaware
No Drawing. Filed Oct. 6, 1964, Ser. No. 402,010
26 Claims. (Cl. 260—895)

This invention relates to acrylonitrile polymers having improved properties. More particularly, the invention relates to imparting flame resistance to acrylonitrile polymers by the use of brominated N,N-dialkylamides.

This application is a continuation-in-part of our co-pending application, Ser. No. 286,210, filed June 7, 1963, now abandoned, and entitled, "Modified Acrylonitrile Polymers."

Acrylonitrile polymer compositions are useful in a wide variety of textile applications but are at a disadvantage in certain applications due to a lack of substantial flame resistance. To overcome this lack of flame resistance, it has been proposed to either copolymerize or blend acrylonitrile polymers with flame proof compositions or to treat the polymer after formation into fibers and filaments with flame proofing agents. For example, copolymerization of acrylonitrile with certain other monomers such as vinyl chloride or vinylidene chloride resulted in considerable improvement in flame resistance, but the product lacked dyeing affinity. Blends of acrylonitrile polymer compositions with polyvinyl chloride, polyvinylidene chloride, phosphonates and phosphates such as monoallyldialkyl phosphates and alkyloxypropene phosphonates and other flame resistant compositions produced fibers with good flame resistance, but such fibers suffered from either a lack of compatibility or permanence of the flame retardant during fiber forming processes. This lack of compatibility was due to the vinyl chloride, vinylidene chloride or other flame resistant portion. Typical manifestations of this incompatibility would be revealed by a separation of spinning solutions into two liquid phases and the resulting fibers would be of inferior quality due to segmentation. In addition, many retardants display poor retention in the fiber because of solubility problems during fiber forming processes.

It is an object of this invention to provide acrylonitrile polymers, copolymers and blends having improved flame resistance and compatibility.

It is another object of this invention to provide a process for the incorporation of brominated N,N-dialkylamides into acrylonitrile polymers.

It is a further object of this invention to provide acrylonitrile fibers, filaments, and other shaped articles having improved flame resistance.

Other objects and advantages of this invention will become apparent from the description which follows hereafter.

Generally, this invention comprises adding and intimately admixing flame retarding amounts of a brominated N,N-dialkylamides with acrylonitrile polymer compositions and thereafter extruding the flame retarded polymeric compositions to form fibers and filaments having improved flame resistance.

The flame retardants of this invention are referred to as brominated N,N-dialkylamides and may be represented by the general formula

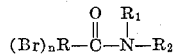

wherein R represents an alkyl radical containing from 5 to 21 carbon atoms, $n$ is an integer of from 2 through 10 inclusive, and $R_1$ and $R_2$ represent lower alkyl groups of from 1 to 6 carbon atoms. Mixtures of the brominated N,N-dialkylamides coming within the purview of the above formula may also be used for the purposes of this invention. The amount of bromination of these amides will, of course, vary with the type of compound employed. As typical examples of the brominated N,N-dialkylamides of this invention, there may be mentioned N,N-dimethyl-9,10-dibromopalmitamide, N,N-dimethyl-9,10-dibromostearamide, N,N-dimethyl-9,10,12,13-tetrabromostearamide, N,N-dimethyl-9,10,12,13,15,16-hexabromostearamide, N,N-dimethyl-5,6,8,9,11,12,14,15-octabromoarachidonamide, 4,5,7,8,11,12,18,18,19,19-decabromodocosanamide, and the like. The N,N-diethyl, -di-n-propyl, -di-i-propyl, -di-n-butyl, -di-sec-butyl, -di-t-butyl, -di-n-amyl, -di-isoamyl, -di-t-amyl, -di-n-hexyl, and the like derivatives of the above amides may be used also. The fats and oils from which the foregoing brominated amides are obtainable include: oleic, linoleic, and linolenic acids from many fats and oils such as soybean oil, linseed oil, and tall oil; palmitoleic acid from soybean oil, arachidonic and clupanodonic acids from fish fats and oils; and the like.

The brominated N,N-dialkylamides may be prepared by mixing the methyl esters of the unsaturated acids with a dialkylamine and heating the mixture at elevated temperatures. After ammonolysis is complete, the unsaturated amide is dissolved in methyl alcohol and bromine is slowly added to the solvent with agitation until a slight excess has been added. The methyl alcohol is then removed by vacuum distillation leaving the brominated N,N-dialkylamide as a residue. In some cases bromination may be followed by chlorination in order to more completely halogenate a mixture of amides. In such products, some of the amines will contain only bromine atoms and others will contain both bromine and chlorine. However, more than fifty percent by weight of the halogen content of the mixture should be bromine.

The amount of amide which may be employed in the practice of this invention may be any amount sufficient to achieve the desired results dependent upon the concentration of bromine in the amide, the concentration of polymer, and various spinning conditions. In general, from about 0.5 percent to about 12.5 percent, based on the weight of the solution, of brominated amide having a bromine content of from about 25 to about 70 percent by weight is used to prepare the spinning solution or dope. The solids content in the spinning solution may range from about 18 to about 30 percent by weight. This provides spinning solution containing from about 0.35 percent to about 2.8 percent, based on the weight of the solution, of bromine. Fiber spun from this spinning solution will comprise from about 3 to 42 percent, based on the total weight of the fiber, of brominated amide and will have a bromine content of from about 2 to about 10 percent, based on the total weight of the fiber. It is preferred to prepare a spinning solution containing from about 1.0 to about 8.0 percent, based on the total weight of the solution, of brominated amide having a bromine content of from about 35 to about 47 percent by weight. This provides a spinning solution containing from about 0.63 to about 1.95 percent, based on the total weight of the solution, of bromine. Fiber spun from this spinning solution will comprise from about 7 to about 20 percent, based on the total weight of the fiber, of brominated amide and will have a bromine content of from about 3.5 to about 7.0 percent, based on the total weight of the fiber.

The method of addition involves preparing a spinning solution containing polymer, solvent, brominated N,N-dialkylamide and any other product improving agents that it may be desirable to have at this point in the process. The various ingredients are thoroughly mixed and will show complete compatibility insofar as the compatibility of the brominated additive with the various polymer compositions is concerned.

The acrylonitrile polymers of this invention include polyacrylonitrile and copolymers, terpolymers, interpolymers, and blends of acrylonitrile with other polymerizable mono-olefinic materials as well as blends of polyacrylonitrile and such polymerized mono-olefinic materials with small amounts of other polymeric materials such as styrene. In general, a polymer made from a monomeric mixture of which acrylonitrile is at least 70 percent by weight of the polymerizable content or a blend of polymers containing at least 70 percent of polymerized acrylonitrile is useful in the practice of this invention. Block and graft copolymers of the same general type are within the purview of this invention.

For example, the polymer may be a copolymer of from 80 to 98 percent acrylonitrile and from 2 to 20 percent of another monomer containing the >C=C< linkage and copolymerizable with acrylonitrile. Suitable mono-olefinic monomers include acrylic, alpha-chloroacrylic and methacrylic acids; the methacrylates such as methyl methacrylate, ethyl methacrylate, butyl methacrylate, octyl methacrylate, methoxymethyl methacrylate, beta-chloroethyl methacrylate, and the corresponding esters of acrylic and alpha-chloroacrylic acids; vinyl chloride, vinyl fluoride, vinylidene chloride, 1-chloro-1-bromoethylene; methacrylonitrile; acrylamide and methacrylamide, alpha-chloroacrylamide or monoalkyl substitution products thereof; methyl vinyl ketone; vinyl carboxylates such as vinyl acetate, vinyl chloroacetate, vinyl propionate and N-vinylsuccinimide; methylene malonic esters; itaconic esters; N-vinylcarbazole; vinyl furane; alpha vinyl esters; vinyl sulfonic acids; ethylene alpha-, beta-dicarboxylic acids or their anhydrides or derivatives such as diethyl fumarate, diethyl maleate, diethyl citraconate, diethyl mesaconate; styrene; vinyl naphthalene; acenaphthalene; vinyl-substituted tertiary heterocyclic amines, such as the vinyl pyridines, for example, 2-vinylpyridine, 4-vinylpyridine, 5-methyl-2-vinylpyridine, and the like, 1-vinylimidazole and alkyl-substituted 1-vinylimidazoles, such as 2-, 4-, or 5-methyl-1-vinylimidazole, and other >C=C< containing copolymerizable materials.

The polymer may be a ternary interpolymer, for example, products obtained by the interpolymerization of acrylonitrile and two or more of any of the monomers enumerated above. More specifically, a useful ternary polymer comprises acrylonitrile, methacrylonitrile, and 2-vinylpyridine. The ternary polymers may contain, for example, from 80 to 97 percent of acrylonitrile, from 1 to 10 percent of a vinylpyridine or a 1-vinylimidazole, and from 1 to 18 percent of another substance, such as methacrylonitrile or vinyl chloride.

The polymer may also be a blend of from 50 to 98 percent of polyacrylonitrile or of a polymer containing from 80 to 99 percent acrylonitrile and from 1 to 20 percent of at least one other >C=C< containing substance copolymerizable with acrylonitrile, with from 2 to 50 percent of a blending polymer of from 10 to 70 percent of acrylonitrile and from 30 to 90 percent of at least one other >C=C< containing polymerizable monomer. Preferably, when the polymeric material comprises a blend, it will be a blend of (1) a copolymer of 90 to 98 percent of acrylonitrile and from 2 to 10 percent of another mono-olefinic monomer such as vinyl acetate, with (2) a sufficient amount of a copolymer of from 10 to 70 percent of acrylonitrile and from 30 to 90 percent of a vinyl-substituted tertiary heterocyclic amine, such as vinylpyridine, methyl vinylpyridine or 1-vinylimidazole, the two blending polymers being so as to give a blend having overall vinyl-substituted tertiary heterocyclic amine content of from 2 to 10 percent based on the weight of the blend. Other blend compositions such as blends of polyvinyl chloride or polyvinylidene chloride with the above described blends, the overall blending compositions containing at least 70 percent polymerized acrylonitrile are also within the purview of this invention.

The polymers useful in the practice of the present invention may be prepared by any conventional polymerization procedure, such as mass polymerization methods, solution polymerization methods, or aqueous emulsion procedures. The preferred practice utilizes suspension polymerization wherein the polymer is prepared in finely divided form for immediate use in the fiber fabrication operations. The preferred suspension polymerization may utilize batch procedures wherein monomers are charged with an aqueous medium containing the necessary catalyst and dispersing agents. A more desirable method involves the semi-continuous procedure in which the polymerization reactor containing the aqueous medium is charged with the desired monomers gradually throughout the course of the reaction. Entirely continuous methods involving the gradual addition of monomers and the continuous withdrawal of polymer may also be employed.

The most effective polymers for the preparation of fibers are those of uniform physical and chemical properties and of relatively high molecular weight. The polymers should have molecular weight of at least about 10,000 and preferably between about 25,000 and 150,000.

In preparing the products of the present invention, conventional equipment ordinarily employed in the manufacture of artificial and synthetic fibers and filaments may be used and particularly the equipment which is usually employed in the manufacture of fibers and filaments from acrylonitrile polymers. The present invention is applicable to the usual methods for forming synthetic filaments and fibers, such as dry spinning, wet spinning and various combinations and modifications thereof. Heat and light stabilizers, such as dibutyltin oxide, phenol, hydroquinone and formaldehyde metal sulfoxylate-inorganic acid combined agents, coflame retardants such as antimony trioxide, anti-corrosive agents such as zinc oxide, delusterants, antistatic agents, lubricants and other like modifying agents may be incorporated with the polymeric compositions disclosed herein during spinning solution preparation or after extrusion and formation of the polymer into fibers without departing from the scope of the invention. It is preferable to add small amounts of heat and light stabilizers, such as dibutyltin oxide, to the spinning solutions of this invention. The stabilizer may be added to the solutions in amounts of from about 0.5 to about 5 percent by weight of the brominated amide present in the solution. It has been found that there will be from 60 percent to 100 percent retention of the stabilizer in the fiber produced.

A preferred embodiment of this invention is the preparation of modified acrylonitrile polymers containing the flame retardants of this invention and stabilized with an epoxy type stabilizer. These epoxy type stabilizers are organic compounds generally containing one or more

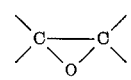

groups. Various substituted and unsubstituted aliphatic, aromatic, alicyclic and heterocyclic groups may be attached to said epoxy groups. Generally, however, the epoxy compounds which are employed should have a boiling point at atmospheric pressure of at least 150° C., otherwise the stabilizing effect is likely to be relatively transitory due to evaporation of the epoxy compound and preferably the epoxy compounds should have a boiling point of at least 200° C. at atmospheric pressure. These epoxy compounds are discussed in detail in U.S. Patent 2,951,052, issued Aug. 30, 1960, to Darby and assigned to Monsanto Chemical Company.

The concentration of the epoxy compound stabilizer may range from about 0.05 to 5.0 percent by weight, based on the weight of the brominated amide present in the solution. Specific epoxy type stabilizers that may be used are the diglycidyl ether of 2,2-bis(4-hydroxyphenyl) propane, such as Epon 828 and Epon 834, and epoxidized soybean oils, such as "Flexol" Plasticizer JPO and Epoxol 7–4.

Epon 828 is an epoxy ether resin manufactured by the Shell Chemical Corporation and prepared by reacting 2,2-bis(4-hydroxyphenyl) propane with epichlorohydrin. It has an average molecular weight of about 380, a softening point of about 8–12° C. (by Durrans' mercury method), a specific gravity of 1.2, an epoxide equivalent weight of about 190, and a 1,2-epoxy equivalency of about 1.8. It may be prepared, for example, according to the procedure described for the preparation of "polyether A" in U.S. Patent 2,643,239.

Epon 834 is an epoxy ether resin manufactured by the Shell Chemical Corporation and prepared by reacting 2,2-bis(4-hydroxyphenyl) propane with epichlorohydrin. It has an average molecular weight of about 510 and an epoxide equivalent weight of about 255.

"Flexol" Plasticizer JPO is an epoxidized soybean oil containing 6.3 percent by weight oxirane oxygen and sold by Union Carbide Chemical Company, 270 Park Avenue, New York, N.Y.

Epoxol 7–4 is an epoxidized soybean oil containing 7.0 percent by weight oxirane oxygen and sold by Swift & Company, Technical Products Dept., 1820 165th Street, Hammond, Ind.

These epoxy type stabilizers are particularly useful in the preparation of fibers using conventional and well known dry spinning processes in which the polymer is dissolved in a suitable solvent and subsequently extruded from a spinneret into a heated atmosphere in order to evaporate the polymer. In a wet spinning process in which the polymer is dissolved in a suitable solvent and extruded from a spinneret into a coagulating bath capable of leaching the solvent from the fiber, the epoxy type stabilizers have a tendency to be leached out with the solvent.

The process and compositions of this invention will result in acrylic fiber compositions having greatly improved flame resistance because of the presence of the retardants and better processing qualities because of the compatibility of the flame retardants with acrylic fiber compositions. It has been determined that better retention of the retardants can be obtained with high polymer solids content. Specific values will depend upon the solubility of the particular acrylic polymer used.

The flame retardants of this invention are retained to a much greater degree than those of the prior art when wet spun into fibers. The amount of bromine retained in the fiber is extremely high and may run as high as 90 percent. In contrast, many well known flame retardants, such as tris(2,3-dichloropropyl) phosphate, leach severely from the wet-spun fiber into the spin bath. The compatibility of the brominated N,N-dialkylamides with the acrylonitrile polymer fibers may help with retention in addition to rendering the fibers of higher quality.

The following examples are presented as a further disclosure and illustration of the improved products of this invention and are not intended as a limitation thereof. In the examples all parts, proportions and percentages are by weight unless otherwise indicated.

In order to determine the extent of improvement in flame resistance of fibers and filaments treated in accordance with the present invention, the following flame test was employed in the examples and will be designated as flame test "A." The tests were run by spreading a 4 inch tubing prepared from the fibers over the pins of a sample holder and clamping a cover on the tubing. This technique presented two layers of the tubing for burning. The flame was applied in a standard one second exposure to all samples and the samples failed to ignite. When the flame was held manually to the surface of the tubing all samples ignited. The flame was held in contact with the tubing to ignite the upper surface of the tubing. The sample was placed prior to ignition on a 45° incline and the time necessary to burn the length of the sample was recorded. If the sample was self extinguishing then this was recorded. Each test was repeated five times and the results averaged. These tests were carried out at the North Carolina State Textile School Textile Research Center in Raleigh, N.C. The specific test employed was equipment that prescribed in ASTM designation D1230–52T.

In the examples, the brominated N,N-dialkylamides used were prepared from the methyl esters of tall oil, linseed oil, and soybean oil and will be referred to in the examples as tall oil amide, linseed oil amide, and soybean oil amide respectively.

The methyl tall oil ester used had an iodine number of 110 and comprised the following ingredients:

| | Percent |
|---|---|
| Palmitic acid | 2–4 |
| Oleic acid | 49–53 |
| Linoleic acid | 44–46 |

The brominated amide prepared from the above mixture comprises N,N-dimethyl-9,10-dibromostearamide and N,N-dimethyl-9,10,12,13-tetrabromostearamide.

The methyl linseed oil ester used had an iodine number of 164 and comprised the following ingredients:

| | Percent |
|---|---|
| $C_{14}$–$C_{20}$ saturated acids, principally palmitic acid and stearic acid | 10 |
| Oleic acid | 19 |
| Linoleic acid | 24 |
| Linolenic acid | 47 |

The brominated amide prepared from the above mixture comprises N,N-dimethyl-9,10-dibromostearamide, N,N-dimethyl-9,10,12,13-tetrabromostearamide, and N,N-dimethyl-9,10,12,13,15,16-hexabromostearamide.

The methyl soybean oil ester used had an iodine number of 132–136 and comprised the following ingredients:

| | Percent |
|---|---|
| Myristic acid | 0.4 |
| Palmitic acid | 10.6 |
| Stearic acid | 2.4 |
| Palmitoleic acid | 1.0 |
| Oleic acid | 23.5 |
| Linoleic acid | 51.2 |
| Linolenic acid | 8.5 |
| $C_{20}$–$C_{24}$ saturated acids | 2.4 |

The brominated amide prepared from the above mixture comprises N,N-dimethyl-9,10-dibromostearamide, N,N-dimethyl-9,10,12,13-tetrabromostearamide, N,N-dimethyl-9,10,12,13,15,16-hexabromostearamide, and N,N-dimethyl-9,10-dibromopalmitamide.

In preparing the brominated N,N-dialkylamides, the methyl esters of tall oil, linseed oil and soybean oil were combined with dimethylamine and heated at elevated temperatures. After ammonolysis was complete, the methyl alcohol was distilled from the reaction mixture under reduced pressure. The unsaturated amide was obtained as a residue. The amide was then melted and bromine slowly added until a slight excess of bromine had been added. The reaction mixture was diluted with methyl alcohol and heated to expel excess bromine. The methyl alcohol was removed by vacuum distillation leaving the brominated N,N-dialkylamide as a residue.

*Example 1*

Into a resin flask was measured 2,190 grams of solvent comprising dimethylacetamide containing 2 percent of acetic acid. Approximately 400 grams of the solvent was transferred to a homogenizer and 16.2 grams of antimony trioxide was added. The mixture was dispersed in a homogenizer for approximately 10 minutes. The dispersed mixture was then added to the remainder of the solvent in the resin flask and the contents of the flask chilled to −10° C. in a Dry Ice-acetone bath. Approximately 810 grams of an acrylic copolymer containing 6.5 percent vinyl acetate and 93.5 percent acrylonitrile was added to the mixture to form a uniform slurry. The slurry was heated at a temperature of 70° C. for 30 minutes. The resulting polymer solution was found to be essentially homogeneous by both visual and microscopic examination with only the small amount of antimony trioxide remaining as a separate phase. The polymer solution was transferred to a spinning apparatus and wet spun into a 300/100 continuous filament fiber having a d.p.f. of 2.70, an elongation of 14 percent, and a tenacity of 2.65 g./d. A coagulation bath consisting of 55 percent of dimethylacetamide containing 2 percent of acetic acid and 45 percent of water at a temperature of 55° C. was used. This fiber was knitted into 4 inch tubing and subjected to flame test "A" in which it burned completely in an average of 19.2 seconds.

*Example 2*

Following the procedure of Example 1, a spinning solution or dope was prepared with the brominated linseed oil amide containing 43.8 percent, by weight bromine added as a flame retardant. In this example, 27.18 percent of the acrylic polymer of Example 1, 69.30 percent of the dimethylacetamide solvent of Example 1, 2.98 percent of the brominated linseed oil amide, and 0.54 percent of antimony trioxide were used to prepare the dope. The sample was spun into fiber using spinning conditions similar to those used in Example 1. A 300/100 continuous filament having a d.p.f. of 2.45, an elongation of 14 percent, and a tenacity of 2.50 g./d. was obtained. Analysis showed the fiber to contain 2.90 percent bromine which is equivalent to 6.6 percent of the brominated amide. The fiber was knitted into 4 inch tubing and subjected to flame test "A" in which it burned completely in an average time of 24.4 seconds.

*Example 3*

Following the procedure of Example 1, a spinning solution or dope was prepared with soybean oil amide containing 43.93 percent by weight bromine added as a flame retardant. In this example, 26.06 percent of the acrylic polymer of Example 1, 70.0 percent of the dimethylacetamide solvent of Example 1, 3.27 percent of brominated soybean oil amide, 0.6 percent of antimony trioxide, and 0.07 percent of dibutyltin oxide were used to prepare the dope. The sample was spun into fiber using spinning conditions similar to those used in Example 1. A 300/100 continuous filament fiber having a d.p.f. of 2.54, an elongation of 13 percent and a tenacity of 2.05 g./d. was obtained. Analysis showed the fiber to contain 3.46 percent bromine which is equivalent to 7.9 percent of the brominated amide. The fiber was knitted into 4 inch tubing and subjected to flame test "A" in which it burned completely in an average time of 36.6 seconds.

*Example 4*

Following the procedure of Example 1, a spinning solution or dope was prepared with soybean oil amide containing 43.93 percent bromine added as a flame retardant. In this example, 25.0 percent of the acrylic polymer of Example 1, 70.0 percent of the dimethylacetamide solvent of Example 1, 4.37 percent of brominated soybean oil amide, 0.6 percent of antimony trioxide and 0.07 percent of dibutyltin oxide were used to prepare the dope. The sample was spun into fiber using spinning conditions similar to those used in Example 1. A 300/100 continuous filament fiber having a d.p.f. of 2.47, an elongation of 14 percent, and a tenacity of 2.16 g./d. was obtained. Analysis showed the fiber to contain 4.68 percent bromine which is equivalent to 10.7 percent of the brominated amide. The fiber was knitted into 4 inch tubing and subjected to flame test "A" in which it was found to be self-extinguishing.

*Example 5*

Following the procedure of Example 1, a spinning solution or dope was prepared with soybean oil amide containing 43.93 percent bromine added as a flame retardant. In this example, 25.33 percent of the acrylic polymer of Example 1, 70 percent of the dimethylacetamide solvent of Example 1, 4.0 percent of brominated soybean oil amide, 0.6 percent of antimony trioxide, and 0.07 percent of dibutyltin oxide were used to prepare the dope. The sample was spun into fiber using spinning conditions similar to those used in Example 1. A 300/100 continuous filament fiber having a d.p.f. of 2.46, an elongation of 12 percent, and a tenacity of 2.07 g./d. was obtained. Analysis showed the fiber to contain 4.21 percent bromine which is equivalent to 9.6 percent of the brominated amide. This fiber was knitted into 4 inch tubing and subjected to flame test "A" in which it was found to be self-extinguishing.

*Example 6*

Following the procedure of Example 1, a spinning solution or dope was prepared with soybean oil amide containing 43.93 percent bromine added as a flame retardant. In this example, 25.33 percent of the acrylic polymer in Example 1, 70 percent of dimethylformamide solvent, 4.0 percent of the brominated soybean oil amide, 0.6 percent of antimony trioxide, and 0.07 percent of dibutyltin oxide were used to prepare the dope. The sample was spun into fiber using spinning conditions similar to those used in Example 1. A 300/100 continuous filament fiber having a d.p.f. of 2.94, an elongation of 15 percent, and a tenacity of 2.12 g./d. was obtained. Analysis showed the fiber to contain 4.60 percent bromine which is equivalent to 10.5 percent of the brominated amide. This fiber was knitted into 4 inch tubing and subjected to flame test "A" in which it was found to be self-extinguishing.

*Example 7*

A fiber was prepared using the ingredients and following the procedure of Example 1, with the exception that the fiber was spun using a coagulation bath consisting of 88 percent of polyethylene glycol having an average molecular weight of 1,000 and 12 percent of dimethylacetamide containing 2 percent of acetic acid. A 300/100 continuous filament fiber having a d.p.f. of 2.60, an elongation of 27 percent, and a tenacity of 3.23 g./d. was obtained. This fiber was knitted into 4 inch tubing and subjected to flame test "A" in which it burned completely in an average time of 22.2 seconds.

*Example 8*

Following the procedure of Example 7, a spinning solution or dope was prepared with brominated tall oil amide containing 35.1 percent bromine added as a flame retardant. In this example, 27.18 percent of the acrylic polymer in Example 7, 69.3 percent of the dimethylacetamide solvent of Example 7, 2.98 percent of brominated tall oil amide, and 0.54 percent of antimony trioxide was used to prepare the dope. The sample was spun into fiber using spinning conditions similar to those used in Example 7. A 300/100 continuous filament fiber having a d.p.f. of 2.43, an elongation of 26 percent, and a tenacity of 2.80 g./d. was obtained. Analysis showed the fiber to contain 2.75 percent bromine which is equivalent to 7.8 percent of the brominated amide. The fiber was knitted into 4 inch tubing and subjected to flame test "A" in which it burned completely in an average time of 25.8 seconds.

*Example 9*

Following the procedure of Example 7, a spinning solution or dope was prepared with brominated linseed oil amide containing 43.8 percent bromine added as a flame retardant. In this example, 27.18 percent of the acrylic polymer of Example 7, 69.3 percent of the dimethylacetamide solvent of Example 7, 2.98 percent of brominated linseed oil amide, and 0.54 percent of antimony trioxide was used to prepare the dope. The sample was spun into fiber using spinning conditions similar to those used in Example 7. A 300/100 continuous filament fiber having a d.p.f. of 2.35, an elongation of 24 percent, and a tenacity of 2.85 g./d. was obtained. Analysis showed the fiber to contain 3.30 percent bromine which is equivalent to 7.5 percent of the brominated amide. The fiber was knitted into 4 inch tubing and subjected to flame test "A" in which it was found to be self-extinguishing.

*Example 10*

Following the procedure of Example 1, a spinning solution or dope was prepared containing 17.94 percent of a blend of "A" 88 percent of a copolymer containing 94 percent acrylonitrile and 6 percent vinyl acetate and "B" 12 percent of a copolymer containing 50 percent of 2-methyl-5-vinyl pyridine and 50 percent of acrylonitrile, 81.7 percent of the dimethylacetamide solvent of Example 1, and 0.36 percent of antimony trioxide. The sample was spun into a fiber using spinning conditions similar to those used in Example 1. A 300/100 continuous filament fiber having a d.p.f. of 2.51, an elongation of 15 percent, and a tenacity of 2.80 g./d. was obtained. The fiber was knitted into 4 inch tubing and subjected to flame test "A" in which it burned completely in an average time of 27.1 seconds.

*Example 11*

Following the procedure of Example 10, a spinning solution or dope was prepared with linseed oil amide containing 43.8 percent bromine added as a flame retardant. In this example, 17.94 percent of the acrylic polymer in Example 10, 79.66 percent of the dimethylacetamide solvent of Example 10, 2.0 percent of brominated linseed oil amide, and 0.4 percent of antimony trioxide was used to prepare the dope. The sample was spun into fiber using spinning conditions similar to those used in Example 10. A 300/100 continuous filament fiber having a d.p.f. of 2.70, an elongation of 11, and a tenacity of 2.35 g./d. was obtained. Analysis showed the fiber to contain 2.9 percent bromine which is equivalent to 6.1 percent of the brominated amide. The fiber was knitted into a 4 inch tubing and subjected to flame test "A" in which it burned completely in an average time of 36.9 seconds.

*Example 12*

Following the procedure of Example 10, a spinning solution or dope was prepared with brominated soybean oil amide containing a 43.93 percent bromine added as a flame retardant. In this example, 17.08 percent of the acrylic polymer in Example 10, 78 percent of the dimethylacetamide solvent of Example 10, 4.42 percent of brominated soybean oil amide, 0.44 percent of antimony trioxide, and 0.055 percent of dibutyltin oxide was used to prepare the dope. The sample was spun into fiber using spinning conditions similar to those used in Example 10. A 300/100 continuous filament fiber having a d.p.f. of 2.56, an elongation of 15 percent, and a tenacity of 2.57 g./d. was obtained. Analysis showed the fiber to contain 6.52 percent bromine which is equivalent to 14.9 percent of the brominated amide. The fiber was knitted into 4 inch tubing and subjected to flame test "A' in which it was found to be self-extinguishing.

*Example 13*

Following the procedure of Example 1, a spinning solution or dope was prepared containing 26.46 percent of a terpolymer containing 87.3 percent of acrylonitrile, 9.7 percent of vinyl acetate and 3 percent of styrene, 73 percent of dimethylformamide solvent, and 0.54 percent of antimony trioxide. The sample was spun into fiber using spinning conditions similar to those used in Example 1. A 300/100 continuous filament fiber having a d.p.f. of 2.67, an elongation of 18 percent, and a tenacity of 2.55 g./d. was obtained. The fiber was knitted into 4 inch tubing and subjected to flame test "A" in which it burned completely in an average time of 30.4 seconds.

*Example 14*

Following the procedure of Example 13, a spinning solution or dope was prepared with brominated linseed oil amide containing 43.8 percent bromine added as a flame retardant. In this example, 27 percent of the terpolymer of Example 13, 69.4 percent of dimethylformamide solvent, 3 percent of brominated linseed oil amide, and 0.6 percent of antimony trioxide was used to prepare the dope. The sample was spun into fiber using spinning conditions similar to those used in Example 13. A 300/100 continuous filament fiber having a d.p.f. of 2.64, an elongation of 14 percent, and a tenacity of 2.83 g./d. was obtained. Analysis showed the fiber to contain 3.1 percent bromine which is equivalent to 7.1 percent of the brominated amide. The fiber was knitted into 4 inch tubing and subjected to flame test "A" in which it burned completely in an average time of 44 seconds.

*Example 15*

Following the procedure of Example 1, a spinning dope was prepared containing 26.46 percent of a terpolymer consisting of 87.3 percent of acrylonitrile, 7.7 percent of vinyl acetate, and 3 percent of styrene, 73 percent of dimethylformamide and 0.54 percent of antimony trioxide. The dope was then transferred to a spinning apparatus and wet spun into a fiber by conventional wet spinning procedures using a coagulation bath consisting of 88 percent of polyethylene glycol having an average molecular weight of about 1,000 and 12 percent of dimethylacetamide containing 2 percent of acetic acid. A 300/100 continuous filament fiber having a d.p.f. of 2.40, an elongation of 25 percent, and a tenacity of 2.83 g./d. was obtained. This fiber was knitted into 4 inch tubing and subjected to flame test "A" in which it burned completely in an average time of 24.4 seconds.

*Example 16*

Following the procedure of Example 15, a spinning dope was prepared with brominated linseed oil amide containing 43.8 percent bromine as a flame retardant. In this example, 27 percent of the acrylic polymer in Example 15, 69.4 percent of dimethylformamide solvent, 3 percent of brominated linseed oil amide, and 0.6 percent of antimony trioxide was used to prepare the dope. The sample was spun into a fiber using spinning conditions similar to those used in Example 15. A 300/100 continuous filament fiber having a d.p.f. of 2.48 an elongation of 20 percent, and a tenacity of 2.38 g./d. was obtained. Analysis showed the fiber to contain 3.6 percent bromine which is equivalent to 8.2 percent of the brominated amide. The fiber was knitted into 4 inch tubing and subjected to flame test "A" in which it was found to be self-extinguishing.

In the above examples, Example 1 is the control for Examples 2–6, Example 7 is the control for Examples 8 and 9, Example 10 is the control for Examples 11 and 12, Example 13 is the control for Example 14, and Example 15 is the control for Example 16.

*Example 17*

A polymer solution containing 69.3 percent of solvent comprising dimethylacetamide containing 2 percent of acetic acid, 0.54 percent of dispersed antimony trioxide, 27.15 percent of an acrylic polymer containing 93.5 percent of acrylonitrile and 6.5 percent of vinyl acetate, 2.98 percent of brominated linseed oil amide containing 43.8 percent of bromine, and 0.03 percent of an epoxide stabilizer, such as Epon 828, may be prepared following the procedure of Example 1. This polymer solution may be dry spun into fiber using conventional dry spinning techniques.

The fiber produced above will have good flame resistance, will be dyeable with basic dyes such as Sevron Blue 2G (Basic Blue 22) and have excellent dyed and undyed lightfastness.

It will be understood to those skilled in the art that many apparently widely different embodiments of this invention may be made without departing from the spirit and scope thereof. Accordingly, it is to be understood that this invention is not limited to the specific embodiment thereof except as defined in the appended claims.

We claim:

1. A fiber-forming composition of matter comprising an acrylonitrile polymer containing at least 70 percent by weight of acrylonitrile and a member selected from the group consisting of (1) a brominated N,N-dialkylamide having the formula

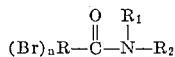

wherein R represents an alkyl radical containing from 2 to 21 carbon atoms, $n$ is an integer of from 2 to 10 inclusive, and $R_1$ and $R_2$ represent lower alkyl groups, and (2) mixtures of said brominated N,N-dialkylamides.

2. A fiber-forming composition of matter comprising an acrylonitrile polymer containing at least 70 percent by weight of acrylonitrile and from about 3 to about 42 percent, based on the total weight of the composition, of a member selected from the group consisting of (1) a brominated N,N-dialkylamide having the formula

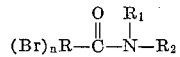

wherein R represents an alkyl radical containing from 5 to 21 carbon atoms, $n$ is an integer of from 2 to 10 inclusive, and $R_1$ and $R_2$ represent lower alkyl groups, and (2) mixtures of said brominated N,N-dialkylamides.

3. A textile fiber comprising the composition of claim 2.

4. A fiber-forming composition of matter comprising an acrylonitrile polymer containing at least 70 percent by weight of acrylonitrile, and from about 7 to about 20 percent, based on the total weight of the composition, of a mixture of brominated N,N-dialkylamides having the formula

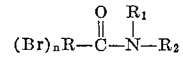

wherein R represents an alkyl radical containing from 5 to 21 carbon atoms, $n$ is an integer of from 2 to 10 inclusive, and $R_1$ and $R_2$ represent lower alkyl groups.

5. A fiber-forming composition of matter comprising an acrylonitrile polymer containing at least 70 percent by weight of acrylonitrile from about 7 to about 20 percent, based on the total weight of the composition, of a mixture of brominated N,N-dialkylamides having the formula

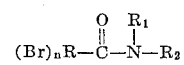

wherein R represents an alkyl radical containing 5 to 21 carbon atoms, $n$ is an integer of from 2 to 10 inclusive, and $R_1$ and $R_2$ represent lower alkyl groups, about 2 percent, based on the total weight of the composition, of antimony trioxide, and from about 1 to about 5 percent, based on the weight of the amide of dibutyltin oxide.

6. A composition of matter as defined in claim 4 wherein the acrylonitrile polymer is a copolymer of at least 80 percent acrylonitrile and up to 20 percent of a copolymerizable mono-olefinic monomer.

7. A composition of matter as defined in claim 4 wherein the acrylonitrile polymer comprises a blend of 80 to 99 percent of (A) a copolymer containing 80 to 98 percent of acrylonitrile and 2 to 20 percent of another mono-olefinic monomer and from 1 to 20 percent of (B) a copolymer containing 10 to 70 percent of acrylonitrile and 30 to 90 percent of a vinyl-substituted heterocyclic amine, said blend having an overall vinyl-substituted tertiary amine content of 2 to 10 percent based on the weight of the blend.

8. A composition of matter as defined in claim 4 wherein the acrylonitrile polymer comprises a terpolymer containing 86 to 93 percent of acrylonitrile, 6 to 10 percent of vinyl acetate, and 1 to 4 percent of styrene.

9. A composition of matter as defined in claim 4 wherein the mixture of brominated N,N-dialkylamides is a mixture of brominated amides prepared by the bromination of the N,N-dimethylamide of tall oil fatty acid fraction and comprising N,N-dimethyl-9,10-dibromostearamide and N,N-dimethyl-9,10,11,12,13-tetrabromostearamide.

10. A composition of matter as defined in claim 4 wherein the mixture of brominated N,N-dialkylamides is a mixture of brominated amides prepared by the bromination of N,N-dimethylamide of linseed oil fatty acid fraction and comprising N,N-dimethyl-9,10-dibromostearamide, N,N - dimethyl - 9,10,12,13 - tetrabromostearamide, and N,N-dimethyl - 9,10,12,13,15,16 - hexabromostearamide.

11. A composition of matter as defined in claim 4 wherein the mixture of brominated N,N-dialkylamides is a mixture of brominated amides prepared by the bromination of the N,N-dimethylamide of soybean oil fatty acid fraction and comprising N,N-dimethyl-9,10-dibromostearamide, N,N-dimethyl-9,10,12,13 - tetrabromostearamide, N,N - dimethyl-9,10,12,13,15,16-hexabromostearamide, and N,N-dimethyl-9,10-dibromopalmitamide.

12. A fiber-forming composition of matter comprising an acrylonitrile polymer containing at least 70 percent by weight of acrylonitrile, a solvent therefor, and from about 0.5 to about 12.5 percent, based on the total weight of the solution, of a member selected from the group consisting of (1) a brominated N,N-dialkylamide having the formula

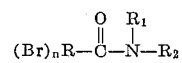

wherein R represents an alkyl radical containing from 5 to 21 carbon atoms, $n$ is an integer of from 2 to 10 inclusive, and $R_1$ and $R_2$ represent lower alkyl groups, and (2) mixtures of said brominated N,N-dialkylamides.

13. A fiber forming composition of matter comprising an acrylonitrile polymer containing at least 70 percent by weight of acrylonitrile, a solvent therefor, and from about 1 to about 8 percent, based on the total weight of the solution, of a member selected from the group consisting of (1) a brominated N,N-dialkylamide having the formula

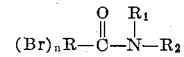

wherein R represents an alkyl radical containing from 5 to 21 carbon atoms, $n$ is an integer of from 2 to 10 inclusive, and $R_1$ and $R_2$ represent lower alkyl groups, and (2) mixtures of said brominated N,N-dialkylamides.

14. A process for the preparation of flame resistant acrylonitrile polymer fibers comprising mixing an acrylonitrile polymer containing at least 70 percent by weight of acrylonitrile with a member selected from the group consisting of (1) a brominated N,N-dialkylamide having the formula

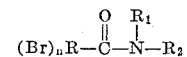

wherein R represents an alkyl radical containing from 5 to 21 carbon atoms, $n$ is an integer of from 2 to 10 inclusive, and $R_1$ and $R_2$ represent lower alkyl groups, and (2) mixtures of said brominated N,N-dialkylamides, in the presence of a solvent for the acrylonitrile polymer and thereafter extruding the resulting solution to form a flame resistant acrylonitrile polymer fiber containing from about 3 to about 42 percent of the brominated amide, based on the weight of the fiber.

15. A process for the preparation of flame resistant acrylonitrile polymer fibers comprising mixing an acrylonitrile polymer containing at least 70 percent by weight of acrylonitrile with a mixture of brominated N,N-dialkylamides having the formula

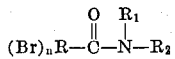

wherein R represents an alkyl radical containing from 5 to 21 carbon atoms, n is an integer of from 2 to 10 inclusive, and $R_1$ and $R_2$ represent lower alkyl groups, in the presence of a solvent for the acrylonitrile polymer and thereafter extruding the resulting solution at a temperature of from about 25 to about 70° C. to form a flame resistant acrylonitrile polymer fiber containing from about 7 to about 20 percent of the brominated amide, based on the weight of the fiber.

16. A process for the preparation of flame resistant acrylonitrile polymer fibers comprising mixing an acrylonitrile polymer containing at least 70 percent by weight of acrylonitrile, a mixture of brominated N,N-dialkylamides having the formula

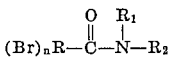

wherein R represents an alkyl radical containing from 5 to 21 carbon atoms, n is an integer of from 2 to 10 inclusive, and $R_1$ and $R_2$ represent lower alkyl groups, antimony, trioxide, and dibutyltin oxide in the presence of a solvent for the acrylonitrile polymer and thereafter extruding the resulting solution at a temperature of from about 25 to about 70° C. to form a flame resistant acrylonitrile polymer fiber containing from about 7 to about 20 percent, based on the total weight of the fiber, of the brominated amide, about 2 percent, based on the total weight of the fiber, of antimony trioxide, and from about 1 to about 5 percent, based on the weight of the amide of dibutyltin oxide.

17. The process as defined in claim 15 wherein the acrylonitrile polymer is a copolymer of at least 80 percent acrylonitrile and up to 20 percent of a copolymerizable mono-olefinic monomer.

18. A process as defined in claim 15 wherein the acrylonitrile polymer comprises a blend of 80 to 99 percent of (A) a copolymer containing 80 to 98 percent of acrylonitrile and 2 to 20 percent of another mono-olefinic monomer and from 1 to 20 percent of (B) a copolymer containing 10 to 70 percent of acrylonitrile and 30 to 90 percent of a vinyl-substituted tertiary heterocyclic amine, said blend having an overall vinyl-substituted tertiary amine content of 2 to 10 percent based on the weight of the blend.

19. A process as defined in claim 15 wherein the acrylonitrile polymer is a terpolymer containing from 86 to 93 percent of acrylonitrile, from 6 to 10 percent of vinyl acetate, and from 1 to 4 percent of styrene.

20. A process as defined in claim 15 wherein the mixture of brominated N,N-dialkylamides is a mixture of brominated amides prepared by the bromination of the N,N-dimethylamide of tall oil fatty acid fraction and comprising N,N-dimethyl-9,10-dibromostearamide and N,N-dimethyl-9,10,12,13-tetrabromostearamide.

21. A process as defined in claim 15 wherein the mixture of brominated N,N-dialkylamides is a mixture of brominated amides prepared by the bromination of the N,N-dimethylamide of linseed oil fatty acid fraction and comprising N,N-dimethyl-9,10-dibromostearamide, N,N - dimethyl-9,10,12,13 - tetrabromostearamide, and N,N - dimethyl-9,10,12,13,15,16-hexabromostearamide.

22. A process as defined in claim 15 wherein the mixture of brominated N,N-dialkylamides is a mixture of brominated amides prepared by the bromination of the N,N-dimethylamide of soybean oil fatty acid fraction and comprising N,N-dimethyl-9,10-dibromostearamide, N, N-dimethyl-9,10,12,13 - tetrabromostearamide, N,N - dimethyl-9,10,12,13,15,16-hexabromostearamide, and N,N-dimethyl-9,10-dibromopalmitamide.

23. A fiber-forming composition of matter comprising an acrylonitrile polymer containing at least 70 percent by weight of acrylonitrile, from about 3 to 42 percent, based on the total weight of the composition, of a member selected from the group consisting of (1) a brominated N,N-dialkylamide having the formula

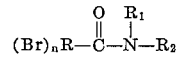

wherein R represents an alkyl radical containing from 5 to 21 carbon atoms, n is an integer of from 2 to 10 inclusive, and $R_1$ and $R_2$ represent lower alkyl groups and (2) mixtures of said brominated N,N-dialkylamides and a stabilizing amount of an epoxy compound characterized by the grouping

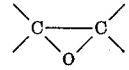

24. A fiber-forming composition of matter comprising an acrylonitrile polymer containing at least 70 percent by weight of acrylonitrile, from about 7 to 20 percent, based on the total weight of the composition, of a member selected from the group consisting of (1) a brominated N,N-dialkylamide having the formula

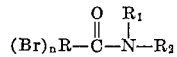

wherein R represents an alkyl radical containing from 5 to 21 carbon atoms, n is an integer of from 2 to 10 inclusive, and $R_1$ and $R_2$ represent lower alkyl groups and (2) mixtures of said brominated N,N-dialkylamides and from about 0.05 to 5.0 percent, based on the weight of brominated N,N-dialkylamide, of an epoxy compound characterized by the grouping

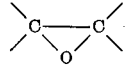

25. A process for the preparation of flame resistant acrylonitrile polymer fibers comprising mixing an acrylonitrile polymer containing at least 70 percent by weight of acrylonitrile, a member selected from the group consisting of (1) a brominated N,N-dialkylamide having the formula

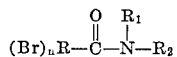

wherein R represents an alkyl radical containing from 5 to 21 carbon atoms, n is an integer of from 2 to 10 inclusive, and $R_1$ and $R_2$ represent lower alkyl groups and (2) mixtures of said brominated N,N-dialkylamides, and an epoxy compound characterized by the grouping

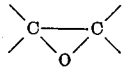

in the presence of a solvent for the acrylonitrile polymer and thereafter extruding the resulting solution into a heated atmosphere to evaporate the solvent and form a flame resistant acrylonitrile polymer fiber containing from about 3 to 42 percent of the brominated amide, based on the weight of the fiber, and a stabilizing amount of the epoxy compound.

26. A process for the preparation of flame resistant acrylonitrile polymer fibers comprising mixing an acrylonitrile polymer containing at least 70 percent by weight of acrylonitrile, a member selected from the group consisting of (1) a brominated N,N-dialkylamide having the formula

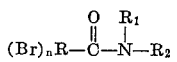

wherein R represents an alkyl radical containing from 5 to 21 carbon atoms, n is an integer of from 2 to 10 inclusive, and $R_1$ and $R_2$ represent lower alkyl groups and (2)

mixtures of said brominated N,N-dialkylamides, and an epoxy compound characterized by the grouping

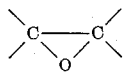

in the presence of a solvent for the acrylonitrile polymer and thereafter extruding the resulting solution into a heated atmosphere to evaporate the solvent and form a flame resistant acrylonitrile polymer fiber containing from about 7 to 20 percent of the brominated amide, based on the weight of the fiber, and from about 0.05 to 5.0 percent of the epoxy compound, based on the weight of the brominated amide.

References Cited by the Examiner

UNITED STATES PATENTS

| | | | |
|---|---|---|---|
| 2,590,211 | 3/1952 | Rugar | 260—895 |
| 2,688,008 | 8/1954 | Chaney | 260—857 |
| 2,676,927 | 4/1954 | McCurdy et al. | 260—895 |
| 3,058,928 | 10/1962 | Eichhorn et al. | 260—895 |
| 3,189,575 | 6/1965 | Horn et al. | 260—45.75 |

MURRAY TILLMAN, *Primary Examiner.*

J. L. WHITE, *Assistant Examiner.*

UNITED STATES PATENT OFFICE
CERTIFICATE OF CORRECTION

Patent No. 3,313,867                                              April 11, 1967

William A. Blackburn et al.

It is hereby certified that error appears in the above numbered patent requiring correction and that the said Letters Patent should read as corrected below.

Column 12, line 12, for "N,N-dimethyl-9,10,11,12,13-tetrabromostearamide" read -- N,N-dimethyl-9,10,12,13-tetrabromostearamide --.

Signed and sealed this 21st day of November 1967.

(SEAL)
Attest:

Edward M. Fletcher, Jr.                                  EDWARD J. BRENNER
Attesting Officer                                             Commissioner of Patents